United States Patent
Lim et al.

(10) Patent No.: US 8,891,377 B2
(45) Date of Patent: Nov. 18, 2014

(54) PACKET RECEIVING AND TRANSMITTING METHOD

(75) Inventors: Kwang-Jae Lim, Daejeon (KR); Chul-Sik Yoon, Seoul (KR)

(73) Assignees: Samsung Electronics Co., Ltd., Suwon-si (KR); Electronics and Telecommunications Research Institute, Daejeon (KR)

(*) Notice: Subject to any disclaimer, the term of this patent is extended or adjusted under 35 U.S.C. 154(b) by 668 days.

(21) Appl. No.: 12/307,731

(22) PCT Filed: Jul. 6, 2007

(86) PCT No.: PCT/KR2007/003302
§ 371 (c)(1),
(2), (4) Date: Jan. 6, 2009

(87) PCT Pub. No.: WO2008/004842
PCT Pub. Date: Jan. 10, 2008

(65) Prior Publication Data
US 2009/0252089 A1 Oct. 8, 2009

(30) Foreign Application Priority Data

Jul. 7, 2006 (KR) .................. 10-2006-0063835
Feb. 23, 2007 (KR) .................. 10-2007-0018395

(51) Int. Cl.
*H04W 28/18* (2009.01)
*H04L 1/16* (2006.01)
*H04L 1/18* (2006.01)
*H04W 28/04* (2009.01)

(52) U.S. Cl.
CPC ............ *H04W 28/18* (2013.01); *H04L 1/1812* (2013.01); *H04L 1/1614* (2013.01); *H04W 28/04* (2013.01)
USPC .......................................... 370/236; 370/349

(58) Field of Classification Search
CPC ..... H04L 47/10; H04L 1/1614; H04L 1/1812; H04W 28/065; H04W 28/12; H04W 28/04; H04W 28/18
USPC ......... 370/241, 252, 310, 345, 349, 351, 389, 370/392, 395.1, 395.3, 431, 436, 437, 464, 370/474
See application file for complete search history.

(56) References Cited

U.S. PATENT DOCUMENTS 5,274,841 A * 12/1993 Natarajan et al. ............. 370/337
6,553,017 B1 * 4/2003 Blum et al. ................... 370/332
(Continued)

FOREIGN PATENT DOCUMENTS

KR 10-2002-0000514 A 1/2002
KR 10-2003-0084735 A 11/2003
(Continued)

*Primary Examiner* — Obaidul Huq
(74) *Attorney, Agent, or Firm* — Jefferson IP Law, LLP

(57) ABSTRACT

An embodiment of the invention provides a method of receiving packets from a transmitting station at a receiving station in a mobile communication system. The packet receiving method includes receiving a radio resource including a data packet and a packet indicator related to the data packet, identifying the packet indicator, and processing the data packet according to the content of the packet indicator. Another embodiment of the invention provides a method of transmitting packets from a transmitting station to a receiving station in a mobile communication system. The packet transmitting method includes receiving a response signal of a first data packet from the receiving station, allocating a second data packet to a radio resource according to the response signal, allocating a packet indicator related to the second data packet to the radio resource, and transmitting the second data packet and the packet indicator to the receiving station.

19 Claims, 7 Drawing Sheets

(56) References Cited

U.S. PATENT DOCUMENTS

| | | | |
|---|---|---|---|
| 6,987,780 B2 | 1/2006 | Wei et al. | |
| 7,036,065 B2 | 4/2006 | Hessel et al. | |
| 7,843,877 B2 * | 11/2010 | Lee et al. | 370/329 |
| 2002/0046379 A1 | 4/2002 | Miki et al. | |
| 2002/0060997 A1 | 5/2002 | Hwang | |
| 2002/0199008 A1 | 12/2002 | Pecen et al. | |
| 2003/0123481 A1 * | 7/2003 | Neale et al. | 370/466 |
| 2003/0169687 A1 * | 9/2003 | Bardini et al. | 370/229 |
| 2003/0169739 A1 | 9/2003 | Lavigne et al. | |
| 2003/0202500 A1 | 10/2003 | Ha et al. | |
| 2004/0037224 A1 * | 2/2004 | Choi et al. | 370/235 |
| 2004/0109433 A1 * | 6/2004 | Khan | 370/345 |
| 2005/0105494 A1 * | 5/2005 | Kim et al. | 370/335 |
| 2006/0184854 A1 | 8/2006 | Ihm et al. | |
| 2006/0195767 A1 | 8/2006 | Ihm et al. | |
| 2006/0240859 A1 * | 10/2006 | Gervais et al. | 455/522 |
| 2007/0060167 A1 * | 3/2007 | Damnjanovic et al. | 455/450 |
| 2008/0005638 A1 * | 1/2008 | Kuo et al. | 714/748 |
| 2009/0034466 A1 * | 2/2009 | Lindskog et al. | 370/329 |

FOREIGN PATENT DOCUMENTS

| | | |
|---|---|---|
| KR | 10-2005-0046484 A | 5/2005 |
| KR | 10-2006-0073991 A | 6/2006 |
| KR | 10-2006-0074014 A | 6/2006 |
| WO | 01/03452 A1 | 1/2001 |
| WO | WO 03005630 A2 * | 1/2003 |

* cited by examiner

PACKET RECEIVING AND TRANSMITTING METHOD

TECHNICAL FIELD

The present invention relates to a packet transmitting method and a packet receiving method. More particularly, the present invention relates to a method of transmitting packets between a base station and a mobile station that is capable of reducing a loss of packets and transmission delay due to errors in a hybrid automatic repeat request (HARQ) response signal in an orthogonal frequency division multiplexing access (OFDMA) mobile communication system using a fixedly allocated radio resource.

BACKGROUND ART

A base station fixedly allocates radio resources in frames to a mobile terminal that periodically generates traffic.

For example, the fixed allocation of radio resources is included in an IEEE 802.20 draft standard (IEEE P802.20/D2.1 Draft Standard for Local and Metropolitan Area Networks—Standard Air Interface for Mobile Broadband Wireless Access Systems Supporting Vehicular Mobility—Physical and Media Access Control Layer Specification).

The allocated radio resource is fixedly used for a mobile terminal without requiring a separate allocation message until the radio resource used is changed or the radio resource is deallocated. Therefore, a radio resource allocation message is not needed for every frame, which makes it possible to reduce overhead due to an allocation message.

Meanwhile, an error control algorithm is divided into an automatic repeat request (ARQ) scheme and a forward error correction scheme. That is, the automatic repeat request is performed in a data link protocol in an OSI model, and the forward error correction is performed in a physical layer.

A hybrid automatic repeat request (HARQ) protocol is a protocol related to the retransmission of packets having errors. The HARQ protocol combines symbols of a transmitted data packet and a retransmitted data packet and decodes the combined data, thereby reducing the number of times the data packet is retransmitted.

The HARQ protocol for controlling errors by combining the automatic repeat request and the forward error correction has also been used to control errors in packets in an orthogonal frequency division multiplexing access (OFDMA) communication system.

However, in the related art, when a fixedly allocated radio resource is used to transmit packets, the loss of packets and time delay occur due to errors in the detection of an HARQ response signal.

For example, it is assumed that a mobile station successfully receives a packet transmitted from a base station according to the HARQ protocol in a downlink, and transmits an acknowledgement (ACK) in response to the reception of the packet; however, the base station misidentifies the acknowledgement (ACK) as a negative acknowledgement (NAK) due to errors in the detection of the response signal.

In this case, first, when the base station uses a fixedly allocated radio resource to transmit a specific packet, the mobile station, which is a receiving station, receives the packet.

When the mobile station successfully receives the packet, the mobile station deletes reception symbol information of the packet from an HARQ receiving buffer and assumes that a new packet will be transmitted from the base station. Simultaneously, the mobile station transmits an acknowledgement (ACK) signal to the base station.

However, when errors occur in the detection of the response signal, the base station is likely to misidentify the acknowledgement (ACK) signal from the mobile station as a negative acknowledgement (NAK) signal. In this case, the base station retransmits the corresponding packet in response to the negative acknowledgement (NAK) signal.

However, since the mobile station determines that the packet transmitted from the base station is the next packet, the mobile station does not combine the symbol of the received packet with the symbols of the previous packets. Therefore, the packet is unnecessarily retransmitted to the mobile station, and the mobile station fails to receive the retransmitted packet. Since the mobile station fails to receive the packet, the mobile station transmits the negative acknowledgement (NAK) signal to the base station, and then the base station receiving the negative acknowledgement signal retransmits the packet to the mobile station.

Since the mobile station assumes that the next packet will be transmitted from the base station, the mobile station fails to receive the retransmitted packet. Therefore, the retransmission of the current packet is repeated several times.

For this reason, in the related art, the method of transmitting packets using a fixedly allocated radio resource according to the HARQ protocol has problems in that packets are redundantly retransmitted between the base station and the mobile station due to errors in the detection of a response signal, which results in the consumption of radio resources.

The above information disclosed in this Background section is only for enhancement of understanding of the background of the invention and therefore it may contain information that does not form the related art that is already known in this country to a person of ordinary skill in the art.

DISCLOSURE OF INVENTION

Technical Problem

The present invention has been made in an effort to provide a method of receiving and transmitting packets between a base station and a mobile station that is capable of reducing the loss of packets and transmission delay due to errors in an automatic repeat request response signal during the transmission of packets in a mobile communication system.

Technical Solution

An embodiment of the invention provides a method of receiving packets from a transmitting station at a receiving station in a mobile communication system. The method includes receiving a radio resource including a data packet and a packet indicator related to the data packet from the transmitting station, identifying the packet indicator, and processing the data packet according to the content of the packet indicator.

Another embodiment of the invention provides a method of transmitting packets from a transmitting station to a receiving station in a mobile communication system. The method includes receiving a response signal of a first data packet from the receiving station, allocating a second data packet to a radio resource according to the response signal, allocating a packet indicator related to the second data packet to the radio resource, and transmitting the second data packet and the packet indicator to the receiving station.

Advantageous Effects

The use of the packet receiving method according to the embodiment of the invention makes it possible to reduce or prevent the loss of packets and transmission delay due to errors in a response signal transmitted according to a hybrid automatic repeat request protocol in an orthogonal frequency division multiplexing access (OFDMA) mobile communication system using a fixed allocation radio resource.

MODE FOR THE INVENTION

Figure 1:
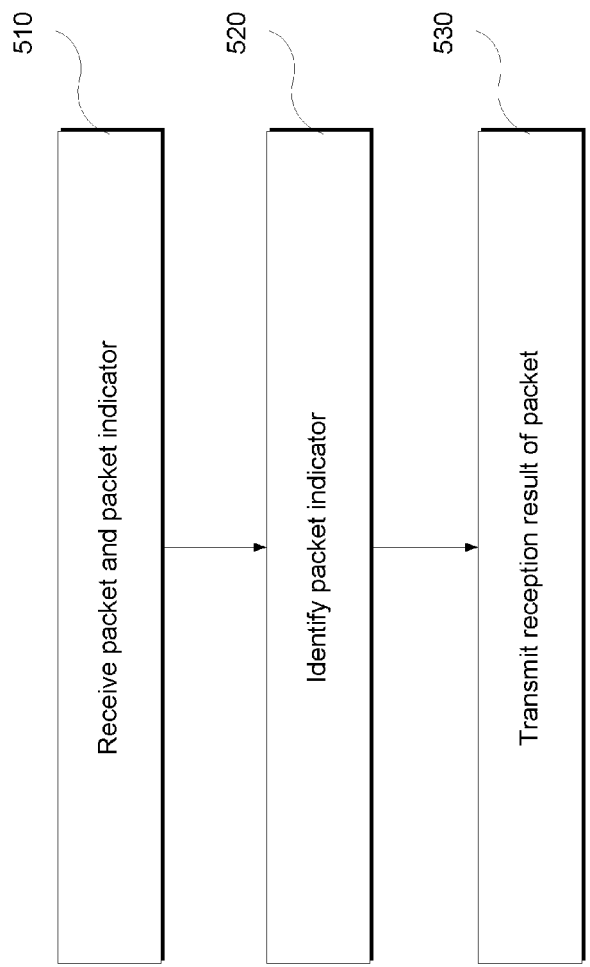
FIG. 1 is a flowchart illustrating an example of a packet receiving method according to an embodiment of the invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Meanwhile, it will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Further, the term "module" used in this specification means a unit for performing a specific function or operation, and the module can be realized by hardware, software, or a combination of hardware and software.

Hereinafter, a method of transmitting packets between a base station and a mobile station of a mobile communication system according to an exemplary embodiment of the present invention will be described in detail with reference to the accompanying drawings.

Figure 2:
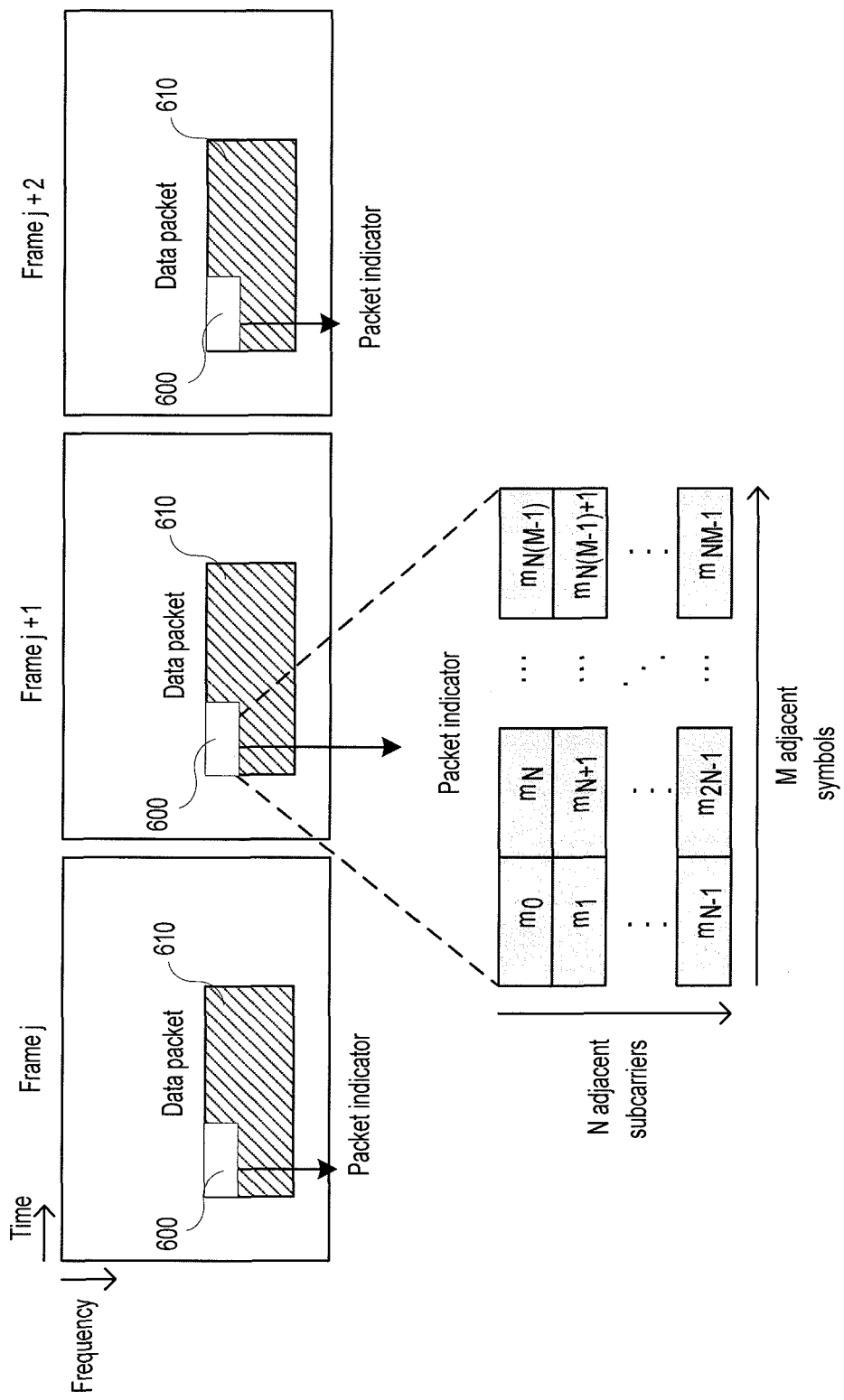
FIG. 2 is a diagram illustrating an example of the arrangement of data packets and packet indicators related to the data packets in frames used in the packet receiving method according to the embodiment of the invention.

FIG. 1 is a flowchart illustrating an example of a packet receiving method according to an embodiment of the present invention. FIG. 2 is a diagram illustrating an example of the arrangement of a data packet 610 and a packet indicator 600 for the data packet 610 in each frame used in the packet receiving method according to the embodiment of the invention.

Before processes shown in FIG. 1 are performed, a pre-process of allocating a predetermined radio resource between the base station and the mobile station and forming an uplink or a downlink so as to transmit/receive an HARQ packet using the allocated radio resource is performed.

In order to perform the pre-process, the base station transmits to the mobile station an allocation message notifying that a specific transfer mode and a predetermined radio resource of the downlink (when the base station is a transmitting station and the mobile station is a receiving station) or the uplink (when the mobile station is a transmitting station and the base station is a receiving station) are fixedly allocated to the mobile station. The allocation message is not retransmitted until the allocated resource or a designated transfer mode is changed.

After the pre-process, the transmitting station transmits to the receiving station a packet indicator 600 (see FIG. 2) included in a portion of the header of the allocated radio resource together with the packet (510).

The position of the packet indicator 600 in a frame and a transfer format thereof need to be predetermined such that the transmitting station and the receiving station can know them beforehand, and before receiving the packet, the receiving station should detect the packet indicator 600 related to the packet. Therefore, the packet indicator 600 is arranged in the header of the radio resource, as shown in FIG. 2.

The packet indicator 600 indicates whether the packet being currently transmitted is a new packet, a previous packet is retransmitted, or no packet is transmitted.

The information bit of the packet indicator may be 2 bits, and represents three different information items.

For example, Table 1 shows information indicated by the packet indicator and information bits thereof.

TABLE 1

| Symbol of packet indicator | Information bit | Content |
|---|---|---|
| DTX | 00 | No packet is transmitted |
| NEW | 01 | A new packet is transmitted |
| RETX | 11 | Previous packet is retransmitted |

The symbols of the packet indicators shown in Table 1 may be changed, and the correspondence between the symbols and the corresponding information bits may be changed.

According to the exemplary embodiment shown in FIG. 1, the packet indicator 600 is modulated into a discrete Fourier transform (DFT) code, and is arranged in the header of the allocated radio resource. In addition, the packet indicator 600 is transmitted in N adjacent sub-carriers in M orthogonal frequency division multiplexing (OFDM) symbol periods. The packet 600 is transmitted by one of the L discrete Fourier transform codes having L (=M×N) lengths according to its contents.

An l-th chip of a c-th discrete Fourier transform code may be expressed by Equation 1 given below:

$$m_{c,l} = A \exp(2pcl/L) \qquad \text{[Equation 1]}$$

where A is the amplitude of a DFT code chip, L=MN, c=0, 1, 2, ..., (L−1), and l=0, 1, 2, ..., (L−1).

In this case, the total number of discrete Fourier transform codes is L, but only three discrete Fourier transform codes DTX, NEW, and RETX are selected and used to transmit three packet indicators. L chips of the selected code are mapped to MN sub-carriers used to transmit the packet indicators, and the mapped chips are transmitted from the transmitting station to the receiving station.

In a packet receiving method according to another exemplary embodiment of the invention, the packet indicator may be modulated into a Walsh code instead of the discrete Fourier transform code. When the Walsh code is used, the length of a code is determined by Equation 2 given below:

$$L=2^z(z=1,2,3,\ldots).$$ [Equation 2]

Referring to FIG. 1 again, after receiving the packet, the receiving station identifies the packet indicator (520).

The receiving station determines which of the three codes is received on the basis of signals detected from the MN sub-carriers, and identifies the received packet indicator on the basis of the correspondence between the code and the packet indicator shown in Table 1.

Since a process of receiving a code is known, a detailed description thereof will be omitted.

The receiving station identifies the packet indicator in step 520, performs a process indicated by the packet indicator, and transmits a response signal indicating whether the packet is received to the transmitting station (530).

Figure 3:
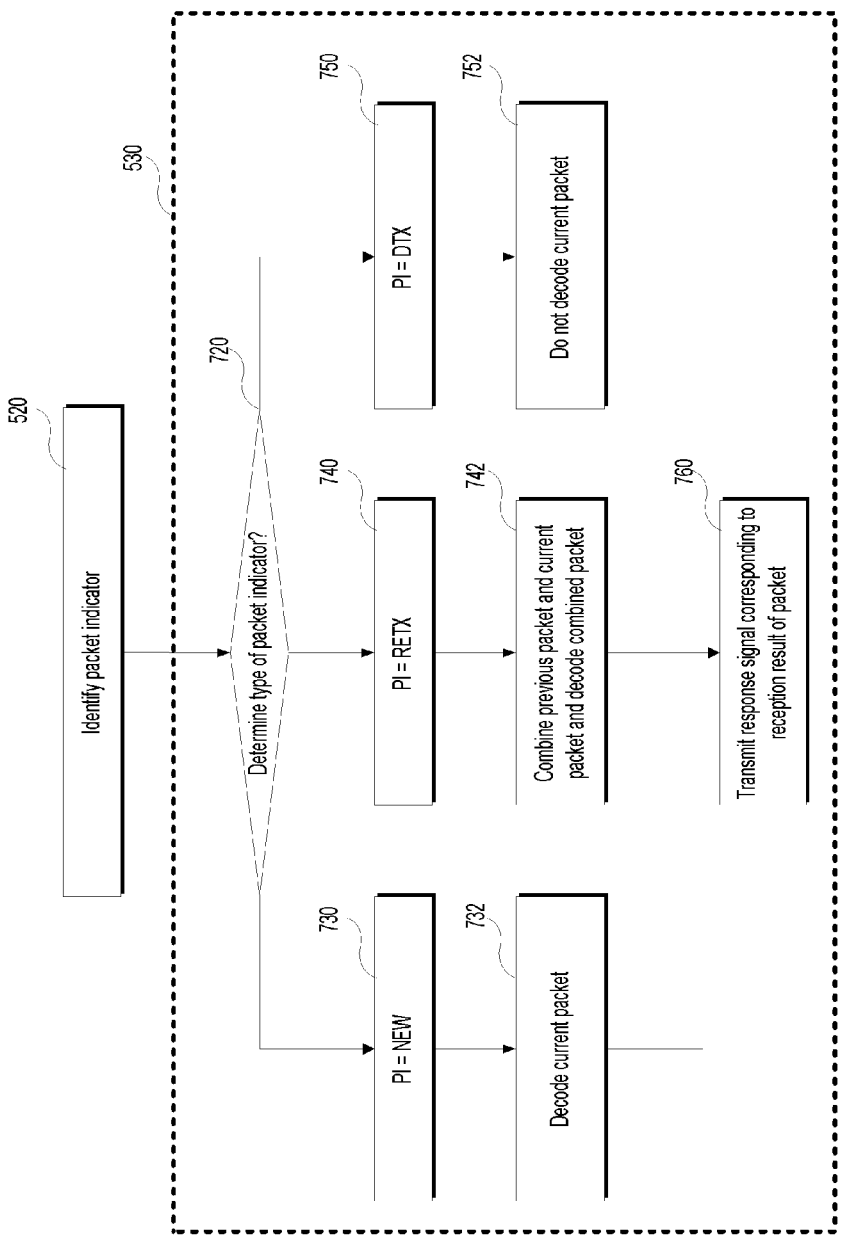
FIG. 3 is a flowchart illustrating step 530 in which a receiving station transmits the reception result of a packet to a transmitting station in the packet receiving method according to the embodiment of the invention in more detail.

FIG. 3 is flowchart illustrating step 530 in more detail in which the receiving station transmits the response signal indicating whether the packet is received in the packet receiving method according to the embodiment of the invention.

When identifying the packet indicator (520), the receiving station determines the type of packet indicator included in the radio resource 720. This is because processes performed by the receiving station are divided according to the type of packet indicator.

If the type of packet indicator is NEW (730), the receiving station uses only a reception symbol of the current packet to decode information bits of the received packet, without combining the reception symbol of the current packet with a reception symbol of a previous packet stored in a packet receiving buffer (732).

If the type of packet indicator is RETX (740), the receiving station combines the reception symbol of the current packet and the reception symbols of the previous packets stored in the packet receiving buffer and decodes the combined data, thereby decoding information bits of the received packet (742).

If the type of packet indicator is DTX (750), the receiving station does not decode the current packet since no packet is transmitted (752).

The receiving station transmits an HARQ response signal to the transmitting station according to whether the packet is successfully received after performing decoding (when the type of packet indicator is RETX or NEW) or not performing decoding (when the type of packet indicator is DTX) (760).

Figure 4:
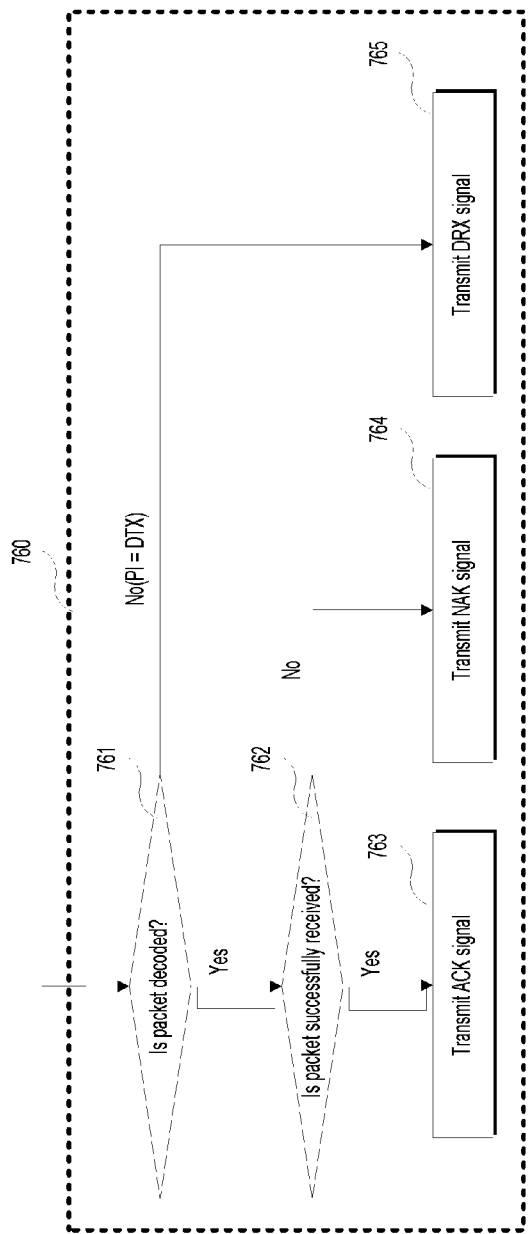
FIG. 4 is a flowchart illustrating step 760 in which the receiving station transmits a response signal corresponding to the reception result of the packet to the transmitting station in FIG. 3 in more detail.

FIG. 4 is a flowchart illustrating step 760 in more detail in which the receiving station transmits a response signal corresponding to the reception result of the packet to the transmitting station in FIG. 3 in more detail.

The receiving station determines whether a packet is successfully received and decoded (761). When the packet is successfully received and decoded (762), the receiving station transmits a response signal indicating acknowledgement (ACK) to the transmitting station (763).

When the decoding of the received packet fails, the receiving station transmits a response signal indicating negative acknowledgement (NAK) to the transmitting station (764).

When the type of packet indicator is DTX and no packet is received, the decoding is not performed. As a result, the receiving station does not transmit a response signal to the transmitting station (765).

Since a method of transmitting the response signal is known, a detailed description thereof will be omitted.

Meanwhile, the size of the radio resource used to transmit packet indicators and power used to transmit codes depend on a channel environment.

For example, in a good channel environment, a modulation and coding scheme having a high degree of bandwidth efficiency may be used to transmit packets. In this case, it is possible to reduce power used to transmit codes and the size of the radio resource used to transmit packet indicators.

In contrast, in a bad channel environment, power and the size of the radio resource increase in order to improve the detection performance of the packet indicator. In this case, the bandwidth efficiency of the modulation and coding scheme is lowered.

Power consumption and the size of the packet indicator corresponding to the modulation and coding scheme are predetermined. The base station notifies the mobile station of a modulation and coding scheme used to transmit packets during a fixed allocation process, and the mobile station can know power and the size of a packet indicator used in the correspondence between a predetermined modulation and coding scheme and the packet indicator.

Figure 5:
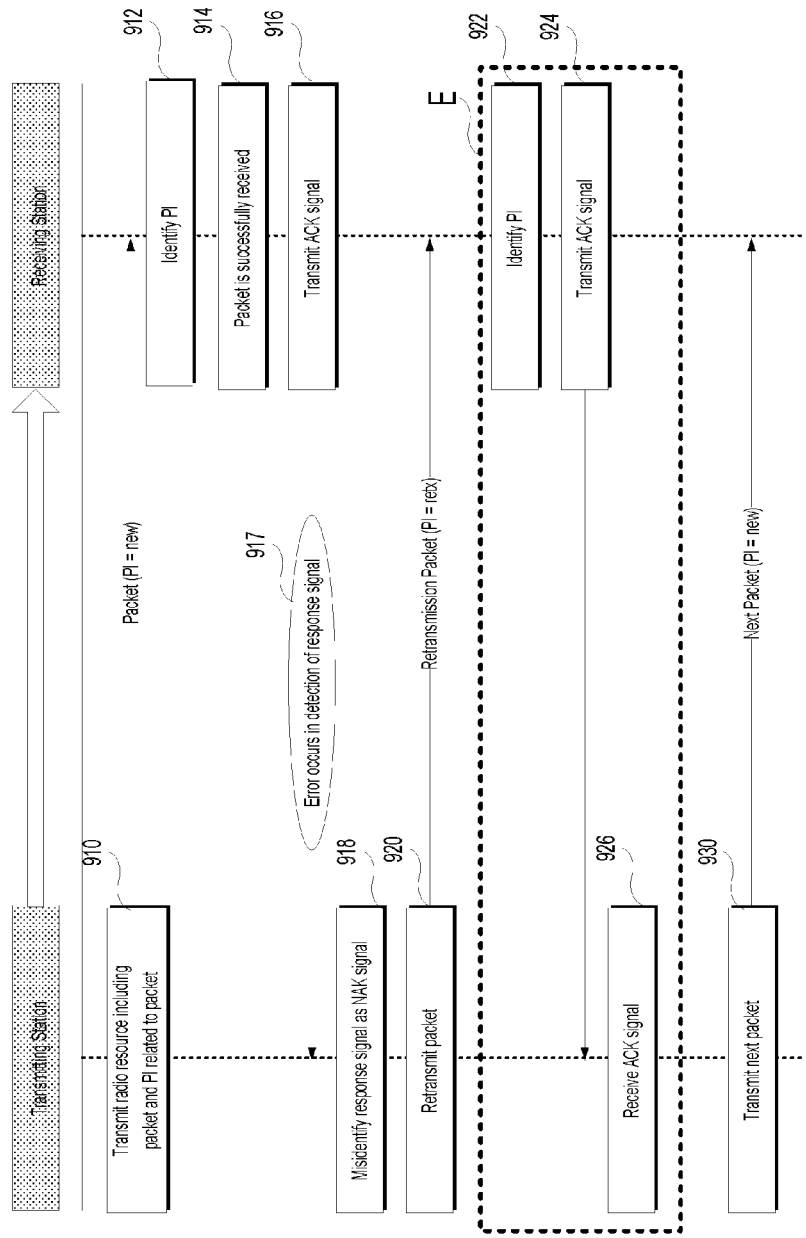
FIG. 5 is a flowchart illustrating an example of packet transmission between the transmitting station and the receiving station in the packet receiving method according to the embodiment of the invention.

FIG. 5 is a flowchart illustrating an example of packet transmission between the transmitting station and the receiving station in the packet receiving method according to the embodiment of the invention.

FIG. 5 shows a flowchart when the transmitting station recognizes that the negative acknowledgement (NAK) signal is received even though the response signal from the receiving station is the acknowledgement (ACK) signal.

The method of transmitting packets between the base station and the mobile station in the mobile communication system shown in FIG. 5 differs from a packet transmitting method according to the related art in that a specific packet and a packet indicator (PI) including information on the packet are transmitted from the transmitting station to the receiving station.

As shown in FIG. 5, when the transmitting station transmits a new packet, the transmitting station transmits a radio resource including a packet indicator related to the packet to the receiving station (910). In this case, the packet indicator includes information (PI=new) indicating that a new packet is transmitted.

After receiving the radio resource from the transmitting station, the receiving station identifies the packet indicator arranged in front of the packet in the radio resource (912). When a new packet is successfully received (914), the receiving station transmits an acknowledgement signal (ACK signal) to the transmitting station (916).

However, for example, when errors occur during the detection of the ACK signal in the transmitting station (917), the receiving station may misidentify the acknowledgement signal as the negative acknowledgement (NAK) signal (918).

The transmitting station retransmits the same packet and a packet indicator related to the packet as a countermeasure against the negative acknowledgement signal according to an HARQ protocol (920). In this case, the packet indicator includes information (PI=retx) indicating that the packet is retransmitted.

The receiving station identifies the packet indicator arranged in front of the retransmitted packet to recognize that the packet is identical with the previous packet (920). Therefore, the receiving station retransmits the acknowledgement signal indicating that the packet is successfully received (924). When no error occurs during the detection of the response signal, the transmitting station normally receives the response signal from the receiving station (926).

In this way, the process of transmitting the packet ends, and the transmitting station can perform a new process of transmitting a radio resource including the next packet and a packet indicator related to the packet (930). Since the next packet is also a new packet, the packet indicator includes information (PI=new) indicating that a new packet is transmitted.

As described above with reference to FIG. 5, unlike the packet transmitting method according to the related art in which redundant transmission between the transmitting station and the receiving station is repeated, resulting in the consumption of radio resources, in the packet transmitting method according to the embodiment of the present invention, the receiving station identifies the packet indicator included in the radio resource and appropriately takes action E against a transmitted packet to prevent the unnecessary consumption of radio resources.

Figure 6:
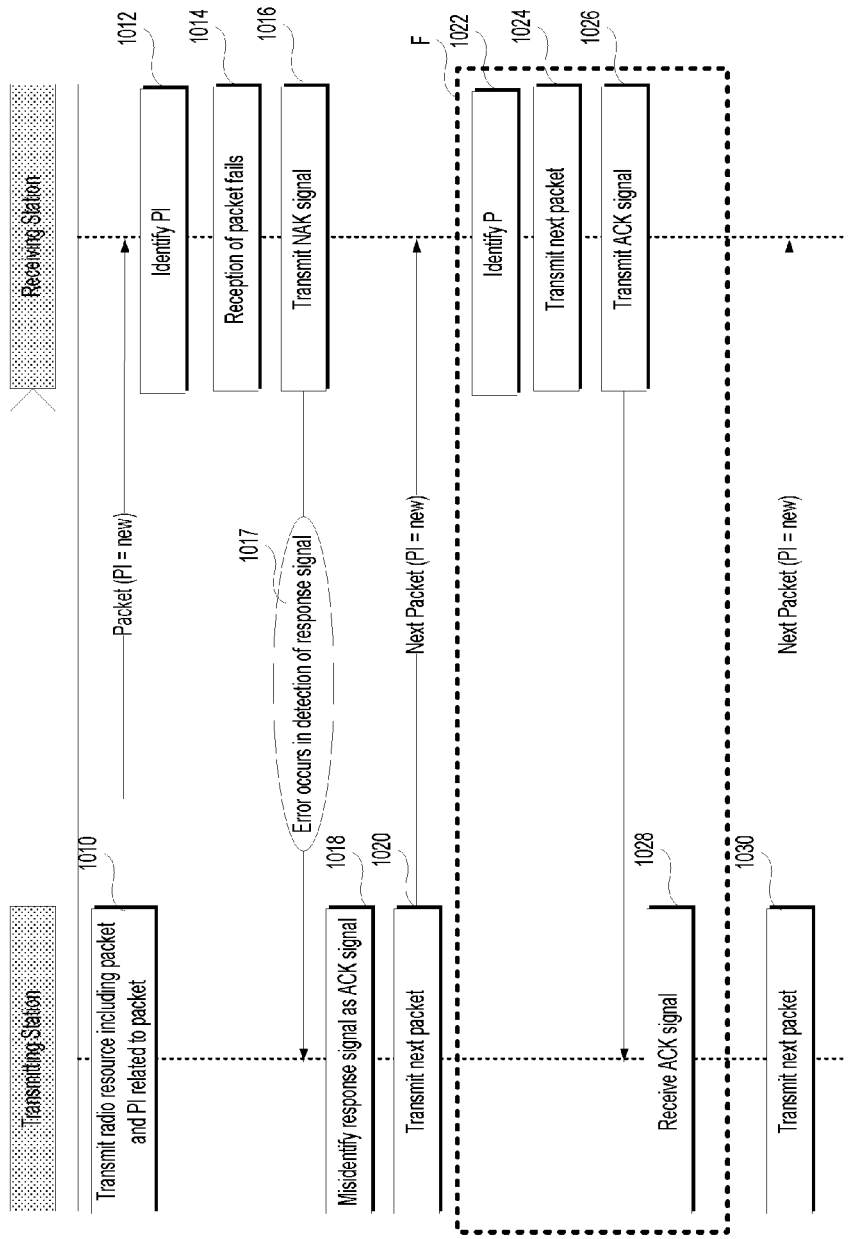
FIG. 6 is a flowchart illustrating another example of the packet transmission between the transmitting station and the receiving station in the packet receiving method according to the embodiment of the invention.

FIG. 6 is a flowchart illustrating another example of the packet transmission between the transmitting station and the receiving station in the packet receiving method according to the embodiment of the invention.

FIG. 6 is a flowchart when the transmitting station recognizes that the acknowledgement (ACK) signal is transmitted from the receiving station even though the negative acknowledgement (NAK) signal is transmitted.

Similar to the example shown in FIG. 5, in the example shown in FIG. 6, when the transmitting station transmits a new packet, the transmitting station transmits a radio resource including a packet indicator related to the packet to the receiving station (1010). In this case, similar to the example shown in FIG. 5, in the example shown in FIG. 6, the packet indicator includes information (PI=new) indicating that a new packet is transmitted.

After receiving the radio resource from the transmitting station, the receiving station identifies the packet indicator arranged in front of the packet in the radio resource (1012). When the receiving station fails to receive a new packet (1014), the receiving station transmits a negative acknowledgement signal (NAK signal) indicating that the reception of the packet fails (1016) to the transmitting station.

However, for example, when errors occur during the detection of the response signal in the transmitting station (1017), the receiving station may misidentify the negative acknowledgement signal as the acknowledgement (ACK) signal (1018).

When the transmitting station misidentifies the response signal as the acknowledgement signal, the transmitting station determines that the packet is successfully transmitted and thus newly transmits a radio resource including the next packet and a packet indicator related thereto (1020). Since the next packet is also a new packet, the packet indicator includes information (PI=new) indicating that a new packet is transmitted.

Since the receiving station receives the negative acknowledgement signal for the current packet, the receiving station expects that the current packet will be retransmitted from the transmitting station. However, the receiving station identifies the packet indicator arranged in front of the packet (1022), and knows that a new packet has been transmitted from the transmitting station, contrary to the actual transmission. Therefore, the receiving station receives the next packet as a new packet (1024), and transmits the acknowledgement signal to the transmitting station as a response signal (1026). Then, the transmitting station receives the acknowledgement signal for the next packet from the receiving station (1028) and starts to process the next packet, which is a new packet.

The example shown in FIG. 6 is different from the related art in a process represented by a character F.

That is, in the packet transmitting method according to the related art, when the receiving station attempts to combine symbols of the current packet and the next packet, the receiving station fails to receive the next packet newly transmitted. Then, a negative acknowledge signal is transmitted due to the failure, and the transmitting station receives the negative acknowledgement signal and retransmits the next packet. This process is repeatedly performed, which results in the consumption of radio resources.

In contrast, in the packet receiving method according to the embodiment of the invention shown in FIG. 6, when the receiving station expects that the current packet will be retransmitted, but recognizes that a new packet has been transmitted according to the packet indicator, the receiving station attempts to decode a new packet without combining the current packet with a new packet, so that the receiving station can continuously receive the next packet (new packet) and subsequent packets without the current packet.

Therefore, it is possible to prevent the consumption of radio resources and transmission delay, which are problems in the related art when the packet is transmitted a maximum number of times.

In the packet receiving method according to the embodiment of the invention, when the mobile station transmits a response signal of a data packet transmitted from the base station according to the HARQ protocol in a downlink, the mobile station transmits the acknowledgement (ACK) signal or the negative acknowledgement (NAK) signal to the base station according to a transmission state by using a channel or a radio resource previously allocated in an uplink, or it does not transmit a response signal in order to notify that no data packet is transmitted from the base station.

Similarly, in the method of transmitting packets between the base station and the mobile station in the mobile communication system according to the embodiment of the invention, when the base station transmits a response signal of a data packet transmitted from the mobile station according to the HARQ protocol in the uplink, the base station transmits a response signal suitable for a transmission state by using an HARQ response bitmap in a mobile application part (MAP) in the downlink.

In this case, the acknowledgement (ACK) signal, the negative acknowledgement (NAK) signal, a non-transmission response signal DRX, or a holding response signal HOLD may be transmitted as the response signal. The non-transmission response signal is a response signal indicating that no data packet is transmitted, and the holding response signal is a response signal transmitted by the base station to request the mobile station to temporarily stop the transmission of packets in the uplink.

Figure 7:
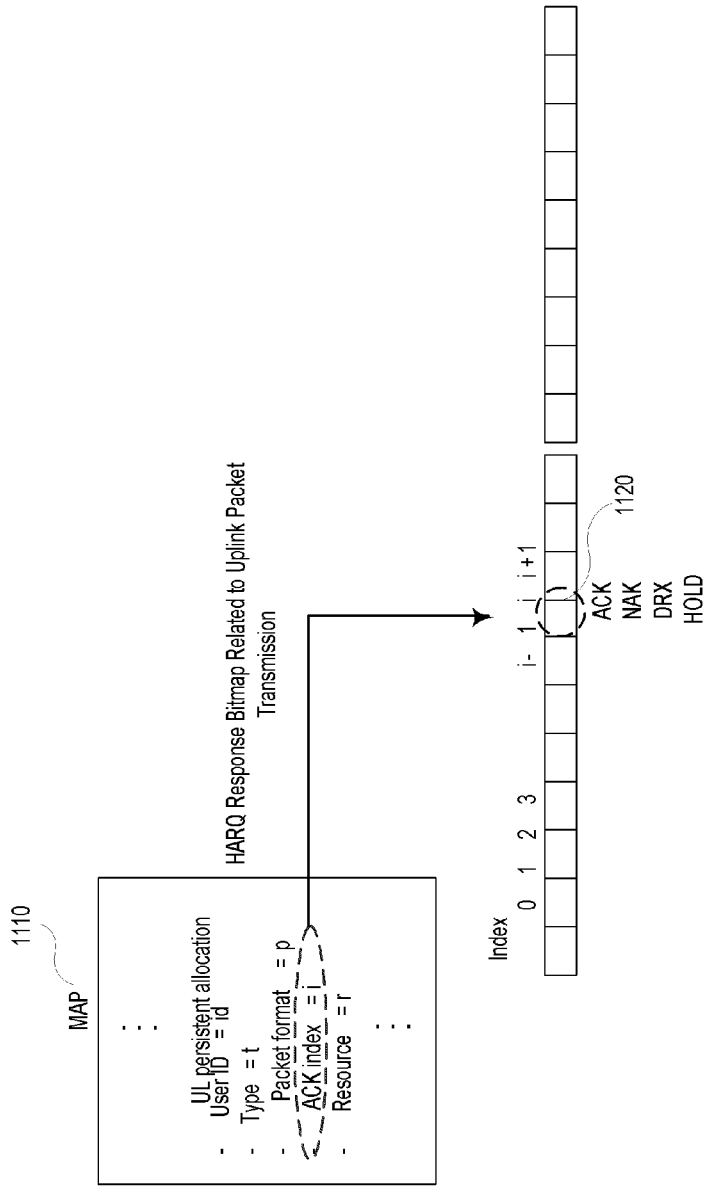
FIG. 7 is a diagram illustrating a transmission process in which a base station uses an HARQ response bitmap to transmit a response signal in a downlink in response to a data packet transmitted from a mobile station in an uplink in a packet transmitting method according to another embodiment of the invention.

FIG. 7 is a diagram illustrating an example of a transmission process in which the base station uses the HARQ response bitmap to transmit a response signal in the downlink in response to the data packet transmitted from the mobile station in the uplink in a packet transmitting method according to an embodiment of the invention.

As shown in FIG. 7, in the base station, a mobile application part (MAP) 1110 for transmitting packets in a downlink frame in order to notify packet transmission allocation performs fixed allocation to transmit a hybrid automatic repeat request (HARQ) to the mobile station in the uplink and designates the position 1120 of a corresponding response signal bit in the HARQ response bitmap.

In FIG. 7, items shown in the MAP 1110 will be described below.

First, an item 'User ID' indicates a unique identification (ID) for identifying a mobile station. In addition, an item 'Type' indicates the type of fixed allocation, and an item 'Packet format' is a field for indicating a transfer mode including a modulation and coding scheme. An item 'ACK index' is a field for indicating the position of an HARQ response bit to be transmitted to a corresponding mobile station in the HARQ response bitmap. The HARQ response bit enables the mobile station to recognize a response signal transmitted from the transmitting station in response to a data packet.

In the HARQ response bitmap, a response bit for each mobile station is composed of 2 bits, and means one of the four types of response signals ACK, NAK, DRX, and HOLD.

When the base station needs to notify the mobile station to temporarily stop transmitting packets in an uplink radio resource fixedly allocated to the mobile station, the base station transmits the holding response signal HOLD.

When the mobile station recognizes that a response bit transmitted from the base station is the holding response signal HOLD in the response bitmap, the mobile station immediately stops transmitting data packets in the uplink.

When the base station wants to allow the mobile station to resume transmitting data packets, the base station transmits a transmission resume (DRX) response signal to the mobile station.

When receiving the DRX response signal from the base station, the mobile station immediately resumes transmitting data packets in the uplink.

The transmission of the DRX response signal from the base station is repeated until the base station transmits an appropriate response signal (ACK or NAK) to the mobile station that resumes transmitting data packets in response to the DRX response signal.

The above-described embodiments of the present invention may be realized by programs corresponding to the configurations of the embodiments of the invention or a recording medium having the programs recorded thereon as well as by apparatuses and methods. In addition, those skilled in the art can easily realize the above-described embodiments of the invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of receiving packets from a transmitting station at a receiving station in a mobile communication system, comprising:
   receiving a radio resource including a packet indicator located in a header of the radio resource, and a data packet that is related to the packet indicator from the transmitting station;
   identifying the packet indicator; and
   processing the data packet according to the content of the packet indicator,
   wherein the packet indicator includes a plurality of bits,
   the packet indicator indicates a first indicator indicating that a new data packet is transmitted when the plurality of bits has a first value,
   the packet indicator indicates a second indicator indicating that a previous data packet is retransmitted when the plurality of bits has a second value,
   the packet indicator indicates a third indicator indicating that no data packet is transmitted when the plurality of bits has a third value,
   the transmitting station is a mobile station, and the receiving station is a base station,
   the method further comprises allocating, by the base station, the radio resource to the mobile station and transmitting, by the base station, a hybrid automatic repeat request response bitmap including the response signal in the form of a response bit composed of a plurality of bits to the mobile station, and
   the hybrid automatic repeat request response bitmap includes a response index indicating the position of the response bit.

2. The packet receiving method of claim 1, wherein the packet indicator is arranged so that the receiving station detects the packet indicator related to the data packet before receiving the data packet in the radio resource.

3. The packet receiving method of claim 1, wherein, when the packet indicator is the first indicator, the processing of the data packet includes receiving the data packet as a new data packet and decoding the received data packet.

4. The packet receiving method of claim 1, wherein, when the packet indicator is the second indicator, the processing of the data packet includes:
   recognizing the data packet as the previous data packet that is retransmitted;
   combining a symbol of the data packet with a symbol of the previous data packet; and
   decoding the combined data.

5. The packet receiving method of claim 1, wherein when the packet indicator is the third indicator, the data packet is not decoded during the processing of the data packet.

6. The packet receiving method of claim 1, further comprising, when the data packet is successfully received, transmitting an acknowledgement signal to the transmitting station indicating that the data packet is successfully received.

7. The packet receiving method of claim 1, further comprising, when the reception of the data packet fails, transmitting a negative acknowledgement signal to the transmitting station indicating that the reception of the data packet fails.

8. The packet receiving method of claim 1, wherein, when no data packet is transmitted, the base station transmits a response signal to the mobile station indicating that the data packet is not decoded.

9. The packet receiving method of claim 1 wherein the base station transmits a holding response signal for allowing the mobile station to temporarily stop transmitting the data packet to the base station.

10. A method of transmitting packets from a transmitting station to a receiving station in a mobile communication system, comprising:
    receiving a response signal of a first data packet from the receiving station;
    allocating a second data packet to a radio resource according to the response signal;
    allocating a packet indicator related to the second data packet to a header of the radio resource; and
    transmitting the second data packet and the packet indicator to the receiving station,
    wherein the packet indicator includes a plurality of bits,
    the packet indicator indicates a first indicator indicating that a new data packet is transmitted when the plurality of bits has a first value, the packet indicator indicates a second indicator indicating that a previous data packet is retransmitted when the plurality of bits has a second value, the packet indicator indicates a third indicator indicating that no data packet is transmitted when the plurality of bits has a third value, the transmitting station is a mobile station, and the receiving station is a base station, the base station allocates the radio resource to the mobile station and transmits a hybrid automatic repeat request response bitmap including the response signal in the form of a response bit composed of a plurality of bits to the mobile station, and the hybrid automatic repeat request response bitmap includes a response index indicating the position of the response bit.

11. The packet transmitting method of claim 10, wherein the packet indicator is arranged so that the receiving station detects the packet indicator related to the data packet before receiving the data packet in the radio resource.

12. The packet transmitting method of claim 10, wherein, when the response signal indicates that the first data packet is successfully received, the first packet indicator is set as the packet indicator.

13. The packet transmitting method of claim 10, wherein, when the packet indicator is the second indicator, the receiving station recognizes the second data packet as the first data packet that is retransmitted, combines a symbol of the second data packet with a symbol of the first data packet, and decodes the combined data.

14. The packet transmitting method of claim 10, wherein, when the packet indicator is the third indicator, the receiving station does not receive the second data packet.

15. The packet transmitting method of claim 10, wherein, when the base station successfully receives the first data packet, the base station transmits the hybrid automatic repeat request response bitmap including an acknowledgement signal indicating that the first data packet is successfully received to the mobile station.

16. The packet transmitting method of claim 10, wherein, when the base station fails to receive the first data packet, the base station transmits the hybrid automatic repeat request response bitmap including a negative acknowledgement signal indicating that the reception of the first data packet fails to the mobile station.

17. The packet transmitting method of claim 10, wherein, when the base station requests the mobile station to temporarily stop transmitting the second data packet, the base station transmits the hybrid automatic repeat request response bitmap including a holding response signal indicating that the transmission of the second data packet should stop to the mobile station.

18. The packet transmitting method of claim 17, wherein, when the base station requests the mobile station to resume transmitting the second data packet, the base station transmits the hybrid automatic repeat request response bitmap including a transmission resume response signal indicating that the transmission of the second data packet should be resumed to the mobile station.

19. The packet transmitting method of claim 18, wherein, when receiving the transmission resume response signal, the mobile station resumes transmitting the second data packet.

* * * * *